United States Patent
Lee et al.

(10) Patent No.: US 11,117,447 B2
(45) Date of Patent: Sep. 14, 2021

(54) AIR CONDITIONER FOR VEHICLE

(71) Applicant: HANON SYSTEMS, Daejeon (KR)

(72) Inventors: Dong Kyu Lee, Daejeon (KR); Tae Yong Park, Daejeon (KR); Sang Gu Woo, Daejeon (KR); Jong Bo Won, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 64 days.

(21) Appl. No.: 16/339,128

(22) PCT Filed: Feb. 6, 2018

(86) PCT No.: PCT/KR2018/001524
§ 371 (c)(1),
(2) Date: Apr. 3, 2019

(87) PCT Pub. No.: WO2018/155839
PCT Pub. Date: Aug. 30, 2018

(65) Prior Publication Data
US 2019/0232759 A1  Aug. 1, 2019

(30) Foreign Application Priority Data

Feb. 22, 2017  (KR) .................. 10-2017-0023246

(51) Int. Cl.
*B60H 1/32* (2006.01)
*B60H 1/00* (2006.01)

(52) U.S. Cl.
CPC ....... *B60H 1/3204* (2013.01); *B60H 1/00007* (2013.01); *B60H 1/00021* (2013.01);
(Continued)

(58) Field of Classification Search
CPC ............ B60H 1/00028; B60H 1/00107; B60H 1/3204; B60H 1/00007; B60H 1/00464; B60H 2001/00078; B60H 2001/00242
See application file for complete search history.

(56) References Cited

U.S. PATENT DOCUMENTS

| 2006/0196205 A1 | 9/2006 | Richter et al. |
| 2008/0196436 A1* | 8/2008 | Connell ............. B60H 1/00378 62/323.3 |

(Continued)

FOREIGN PATENT DOCUMENTS

| JP | 2010013044 A | * | 1/2010 | ......... B60H 1/00057 |
| JP | 2010013044 A | | 1/2010 | |

(Continued)

OTHER PUBLICATIONS

English translation of JP2010013044A (Year: 2010).*
(Continued)

*Primary Examiner* — Frantz F Jules
*Assistant Examiner* — Schyler S Sanks
(74) *Attorney, Agent, or Firm* — Dickinson Wright PLLC (57) ABSTRACT

The present invention relates to an air conditioner for a vehicle, which takes up less installation space due to its compact-sized structure and effectively performs cooling and heating with a simple structure. The air conditioner for a vehicle includes: a case (10) having an air inflow port and an air outflow port; a blower for introducing air into the air inflow port to send the air into the case (10); a compressor (30) for compressing refrigerant; a heat exchanger for exchanging heat between refrigerant and air; and an expansion means for throttling the refrigerant, wherein the blower, the compressor (30), and the heat exchange are arranged inside the case (10) side by side to be formed in a flat type.

11 Claims, 8 Drawing Sheets

(52) U.S. Cl.
CPC ..... *B60H 1/00271* (2013.01); *B60H 1/00464* (2013.01); *B60H 2001/00078* (2013.01); *B60H 2001/00242* (2013.01)

(56) References Cited

U.S. PATENT DOCUMENTS

| | | | |
|---|---|---|---|
| 2009/0193830 A1* | 8/2009 | Yoshioka | B60H 1/323 62/239 |
| 2018/0201088 A1* | 7/2018 | Nomura | F25B 47/02 |

FOREIGN PATENT DOCUMENTS

| | | |
|---|---|---|
| KR | 20020007829 A | 1/2002 |
| KR | 20070064744 A | 6/2007 |

OTHER PUBLICATIONS

International Search Report and Written Opinion dated May 17, 2018 from corresponding International Patent Application No. PCT/KR2018/001524 with English translation of International Search Report.

* cited by examiner

AIR CONDITIONER FOR VEHICLE

CROSS-REFERENCE TO RELATED APPLICATIONS

This application is a U.S. National Stage of International Application No. PCT/KR2018/001524, filed Feb. 6, 2018, which claims the benefit and priority of KR 10-2017-0023246 filed Feb. 22, 2017. The entire disclosures of each of the above applications are incorporated herein by reference.

TECHNICAL FIELD

The present invention relates to an air conditioner for a vehicle, and more particularly, to an air conditioner for a vehicle which is installed in a trunk of a vehicle to be compact, thereby assisting a front main air conditioner and individually cooling and heating the interior of the vehicle.

BACKGROUND ART

In general, an air conditioner for a vehicle is installed in a vehicle for the purpose of cooling or heating the interior of the vehicle in the summer season or the winter season or removing frost from a windshield in the rainy season or the winter season to thereby secure a driver's front and rear visual fields. Such an air conditioner is a device to heat or cool the interior of the vehicle by heating or cooling air after introducing outdoor air into the interior of the air conditioner or circulating indoor air.

Such an air conditioner for a vehicle is generally installed between an engine room and a dash panel of the front of the vehicle. In the meantime, Korean Patent No. 10-1500104 (granted on Mar. 2, 2015) discloses a rear seat air conditioning system for a vehicle, which can cool and heat a rear seat with small size and capacity through seat air-conditioning and loop air-conditioning for rear seat passengers. Moreover, Japanese Patent Publication No. 2016-145015 (published on Aug. 12, 2016) discloses a seat air conditioner which is independently and individually operated by a seat unit of a vehicle.

The rear seat air conditioning system has a disadvantage in that air-conditioning performance is deteriorated and a duct structure for transferring air-conditioning wind is complicated since performing cooling and heating using air-conditioning wind of a front seat air conditioner of the vehicle or using a thermoelectric device.

Furthermore, the seat air conditioner may give the passenger an unpleasant feeling due to vibration transferred to a seat and a passenger since an air-conditioning unit having driving parts, such as a compressor and a blower, is disposed below a seating part to be integrated with the seat. Additionally, the conventional seat air conditioner has another disadvantage in that temperature of the interior of the vehicle rises according to operation of the seat air conditioner since waste heat passing a condenser is discharged toward the interior of the vehicle. In addition, the conventional seat air conditioner has a further disadvantage in that it is difficult to move or rotate the seat if the air-conditioning unit having the compressor is mounted integrally since a space below the seat is not sufficient.

DISCLOSURE

Technical Problem

Accordingly, the present invention has been made in view of the above-mentioned problems occurring in the prior art, and it is an object of the present invention to provide an air conditioner for a vehicle, which takes up less installation space due to its compact-sized structure and effectively performs cooling and heating with a simple structure.

Technical Solution

To accomplish the above object, according to the present invention, there is provided an air conditioner for a vehicle including: a case having an air inflow port and an air outflow port; a blower for introducing air into the air inflow port to send the air into the case; a compressor for compressing refrigerant; a heat exchanger for exchanging heat between refrigerant and air; and an expansion means for throttling the refrigerant, wherein the blower, the compressor, and the heat exchange are arranged inside the case side by side to be formed in a flat type.

Advantageous Effects

As described above, the air conditioner for a vehicle according to the present invention takes up less installation space due to its compact-sized structure, and can realize a thin module since main parts are arranged on a plane and make better use of a space when the air conditioner is installed in a vehicle. Moreover, the air conditioner for a vehicle according to the present invention can perform heating and cooling effectively due to its simple structure, and prevent rise of temperature of the interior caused by operation of a refrigeration cycle since waste heat is discharged to a trunk or out of the vehicle, and enhancing air-conditioning performance by increasing thermal efficiency.

MODE FOR INVENTION

Hereinafter, an air conditioner for a vehicle of the present invention will be described in detail with reference to the accompanying drawings.

Figure 1:
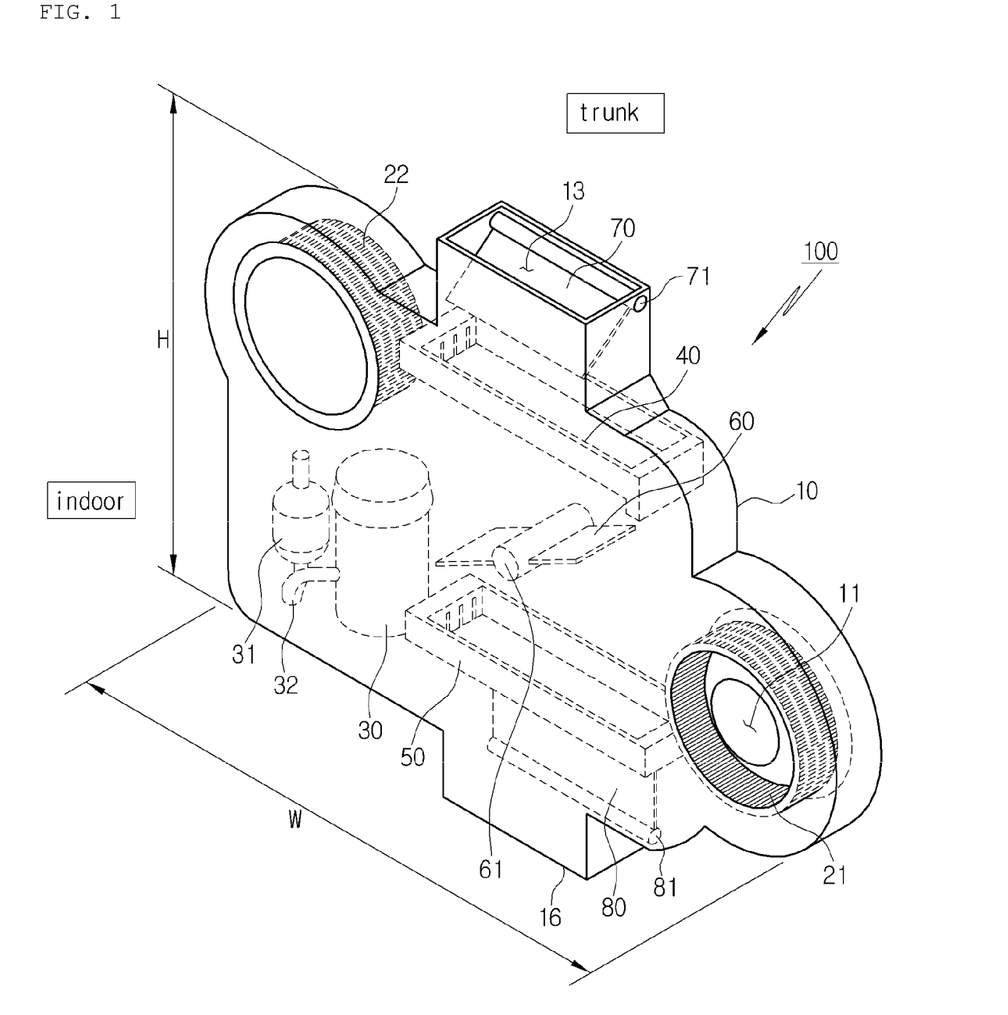
FIG. 1 is a perspective view showing an air conditioner for a vehicle according to a preferred embodiment of the present invention.
Figure 2:
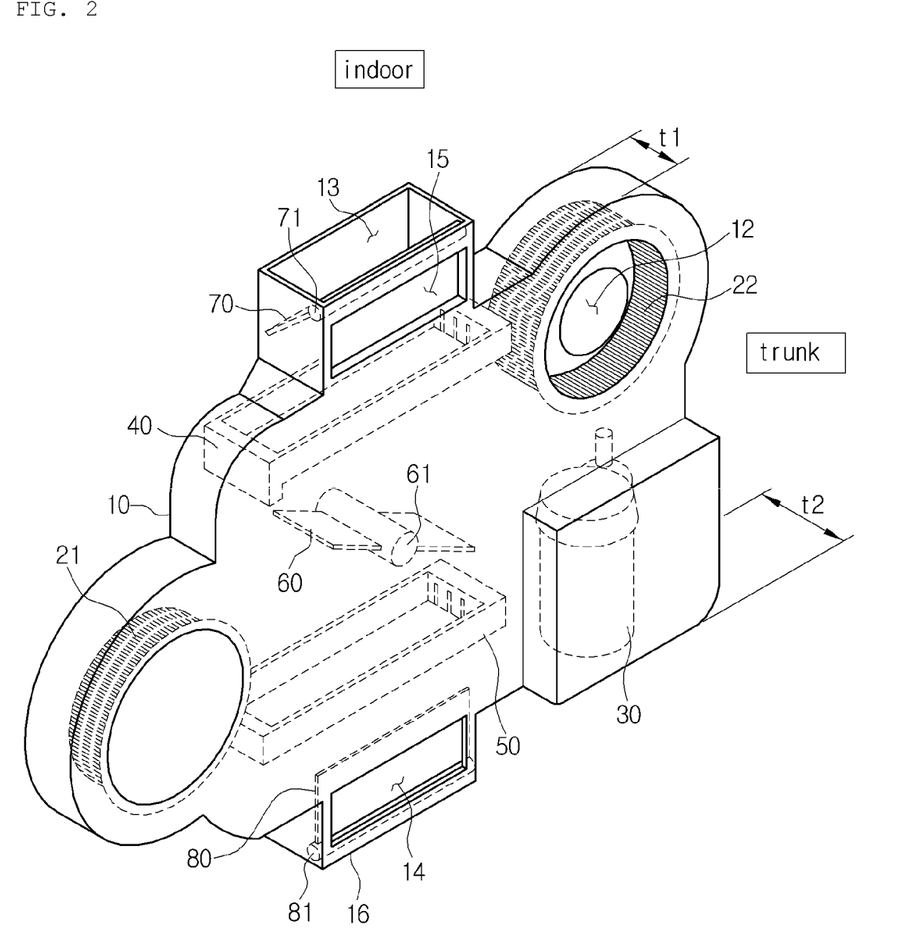
FIG. 2 is a rear perspective view of FIG. 1.
Figure 3:
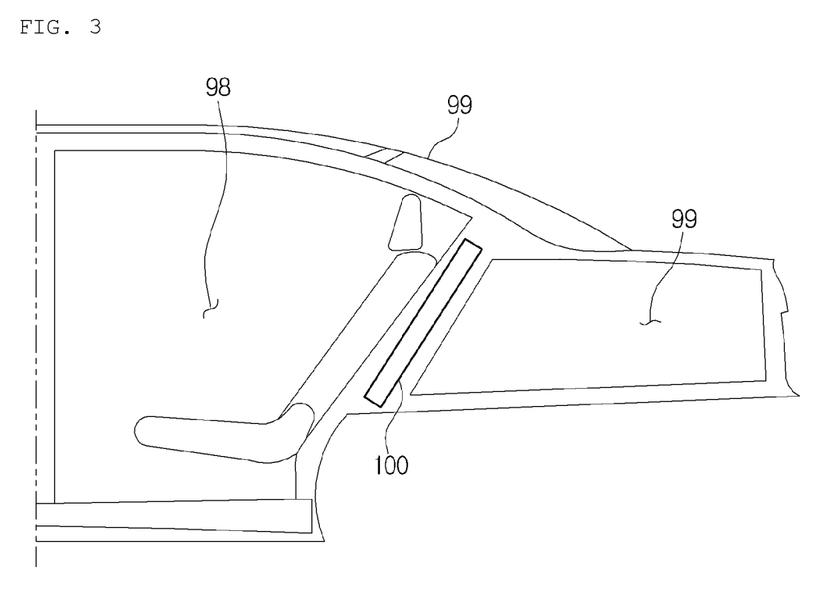
FIG. 3 is a view showing an installation example of the air conditioner for a vehicle.

FIG. 1 is a perspective view showing an air conditioner for a vehicle according to a preferred embodiment of the present invention, FIG. 2 is a rear perspective view of FIG. 1, and FIG. 3 is a view showing an installation example of the air conditioner for a vehicle.

As shown in FIGS. 1 to 3, the air conditioner for a vehicle according to the preferred embodiment of the present invention includes: a case 10 having an air inflow port and an air outflow port; a blower for introducing air into the air inflow port to send the air into the case 10; a compressor 30 for compressing refrigerant; a heat exchanger for exchanging heat between refrigerant and air; and an expansion means for throttling the refrigerant.

The air conditioner for a vehicle is formed in a plate shape with a predetermined thickness, namely, in a flat type. The air conditioner 100 is a flat type which is thin in a thickness direction (t1) and is relatively small in width (W) and height (H). Moreover, the air conditioner 100 includes the blower, the compressor 30, the heat exchanger, and the expansion means arranged side by side inside the case 10.

In this embodiment, as shown in FIG. 3, the air conditioner 100 is installed at a proper place of a vehicle 97 among an interior 98 and a trunk 99 of the vehicle in the thickness direction (t1). One side of the air conditioner 100 in the thickness direction (t1) is arranged to face the interior of the vehicle, and the other side is arranged to face the trunk. However, the air conditioner 100 may be installed at another place of the vehicle, such as a seat back or a bottom end of a seat.

The air conditioner 100 independently performs air conditioning regardless of engine ignition. The air conditioner 100 acts as an auxiliary air conditioner installed in the vehicle, apart from the front air conditioner installed at an engine room side of the vehicle, or may perform air-conditioning of the vehicle by being independently installed without the front air conditioner.

The air conditioner 100 also includes an accumulator 31, a refrigerant pipe 32, a direction-changing door 60, first and second doors 70 and 80, and an actuator, which are mounted inside the case 10. Because the components are arranged in the thin case 10 flatways, main components are arranged on a plane to reduce the thickness (t1) of the module, thereby being capable of being designed in a compact size and enhancing use of a space.

The compressor 30 is an electric compressor, and discharges refrigerant after compressing the refrigerant into a high temperature and high pressure state. The heat exchanger includes a condenser 40, which exchanges heat between the refrigerant discharged from the compressor 30 and air, and an evaporator 50, which exchanges heat between the refrigerant passing the expansion means and air to evaporator the refrigerant.

The expansion means expands the refrigerant into a low temperature and low pressure state by throttling the refrigerant, and may be a TXV, an EXV or others. The accumulator 32 for separating the refrigerant into a gas-phase refrigerant and a liquid-phase refrigerant is disposed at the upstream side of the compressor 30 in a refrigerant flow direction. The compressor 30, the condenser 40, the expansion means, and the evaporator 50 are mounted in the refrigerant pipe 32 in order.

Furthermore, the direction changing door 60 is disposed inside the case 10. The direction changing door 60 makes the air introduced into the air inflow port selectively flow to the condenser 40 and the evaporator 50. The direction changing door 60 is disposed on the case 10 to rotate on a rotary shaft 61.

The case 10 includes: an indoor air inlet 11 for introducing indoor air; an outdoor air inlet 12 for introducing outdoor air; a first indoor outlet 13 and a second indoor outlet 16 for discharging air to the interior of the vehicle; and a first outdoor outlet 15 and a second outdoor outlet 14 for discharging air to the exterior of the vehicle.

One among the condenser 40 and the evaporator 50 is arranged to be higher than the other one in a height direction (H). In this embodiment, the condenser 40 is arranged higher than the evaporator 50. Additionally, the indoor air inlet 11 and the outdoor air inlet 12 are formed to be in the opposite direction to each other in the thickness direction (t1). That is, the indoor air inlet 11 is formed to face the interior of the vehicle, and the outdoor air inlet 12 is formed to face the trunk.

Moreover, the indoor air inlet 11 and the outdoor air inlet 12 are formed to be in the opposite direction to each other in the width direction (W). In this instance, the width direction (W) is the same as the lateral width direction of the vehicle. Furthermore, the indoor air inlet 11 and the outdoor air inlet 12 are formed to be in the opposite direction to each other in the height direction (H). That is, the outdoor air inlet 12 is arranged to be lower than the indoor air inlet 11. Finally, the outdoor air inlet 12 and the indoor air inlet 11 are arranged in a diagonal direction.

The direction changing door 60 is disposed between the condenser 40 and the evaporator 50. Additionally, inside the case 10, the direction changing door 60 includes: a first door 70 for selectively discharging air to the first indoor outlet 13 and the first outdoor outlet 15; and a second door for selectively discharging air to the second indoor outlet 16 and the second outdoor outlet 14.

The indoor air inlet 11, the outdoor air inlet 12, the first indoor outlet 13, the second indoor outlet 16, the first outdoor outlet 15 and the second outdoor outlet 14 are all communicated with one another, and an air passageway in which air flows is formed inside the case 10. The air passageway can properly vary a flow of air by operation of the direction changing door 60, the first door 70, and the second door 80.

A first blower 21 and a second blower 22 are respectively disposed in the indoor air inlet 11 and the outdoor air inlet 12. Axial directions of blower wheels of the first blower 21 and the second blower 22 are arranged to be side by side with the thickness direction (t1).

Furthermore, a rotary shaft 61 of the direction changing door 60 is also arranged to be side by side with the thickness direction (t1). In the meantime, a rotary shaft 71 of the first door 70 and a rotary shaft 81 of the second door 80 are arranged to be side by side with the width direction (W).

The direction changing door 60 is arranged between the indoor air inlet 11 and the outdoor air inlet 12 in the width direction (W) and between the condenser 40 and the evaporator 50 in the height direction (H). Moreover, the first indoor outlet 13 and the first outdoor outlet 15 are formed at an upper part, and the second indoor outlet 16 and the second outdoor outlet 14 are formed at a lower part.

As described above, the axial directions of the blower wheels of the first blower 21 and the second blower 22, the rotary shaft direction of the direction changing door 60, the rotary shaft directions of the first door 70 and the second door 80, directions and positions of the air inflow port and the air outflow port, and positions and directions of the components are optimized, so the components can be efficiently arranged in the flat type structure, which is relatively thin, to realize a slim design.

Figure 4:
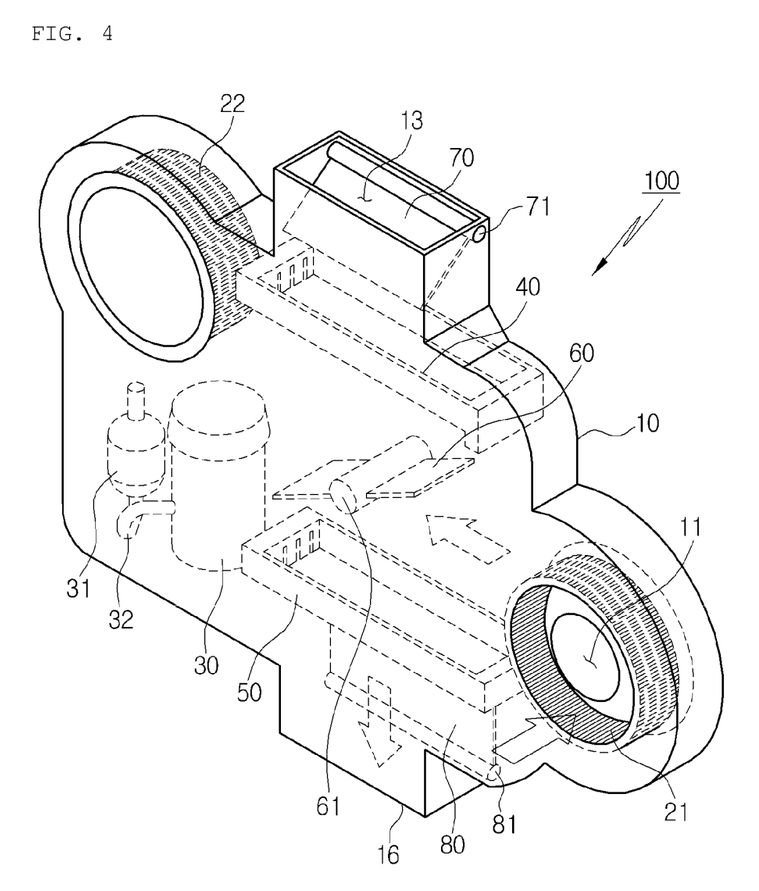
FIGS. 4 and 5 are views showing a used state of the air conditioner for a vehicle in a cooling mode.
Figure 5:
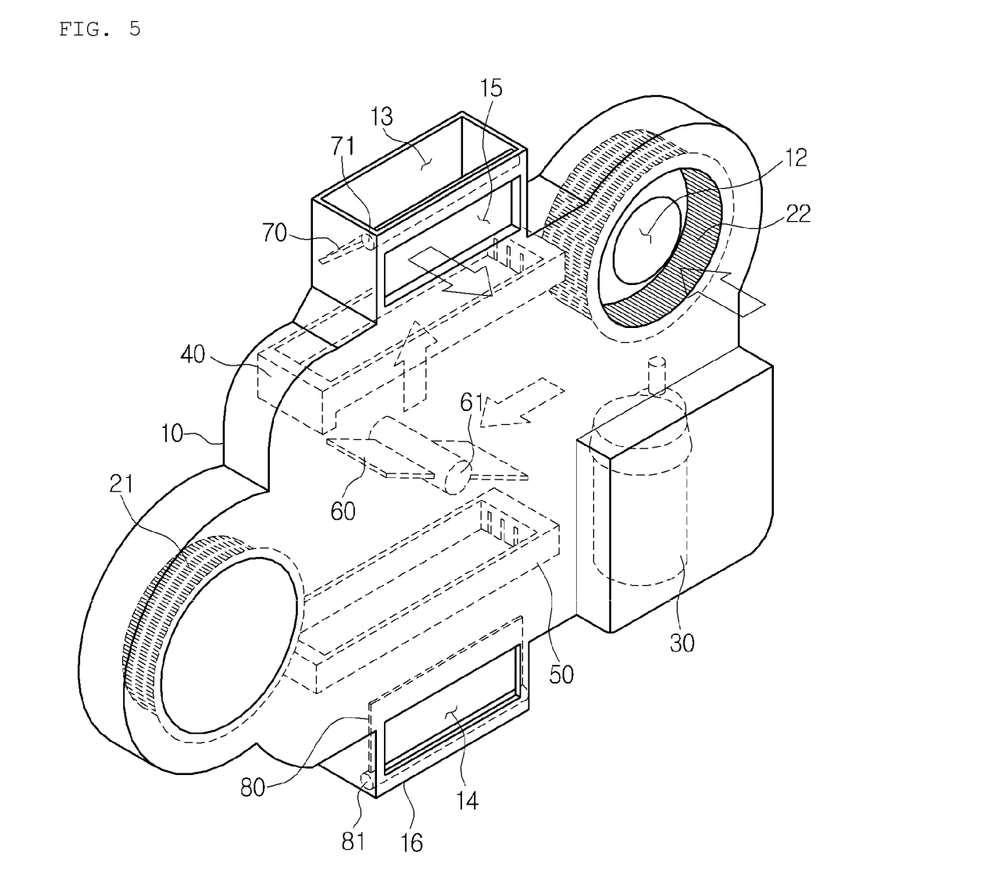
Figure 6:
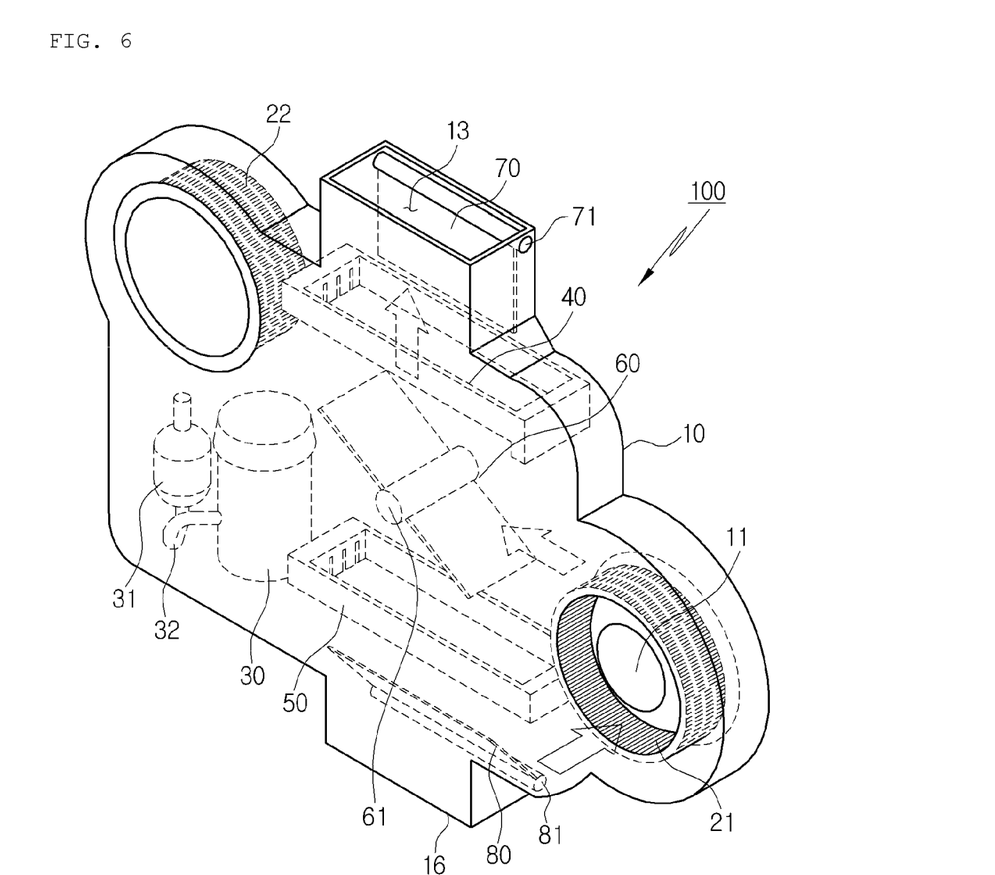
FIGS. 6 and 7 are views showing a used state of the air conditioner for a vehicle in a heating mode.
Figure 7:
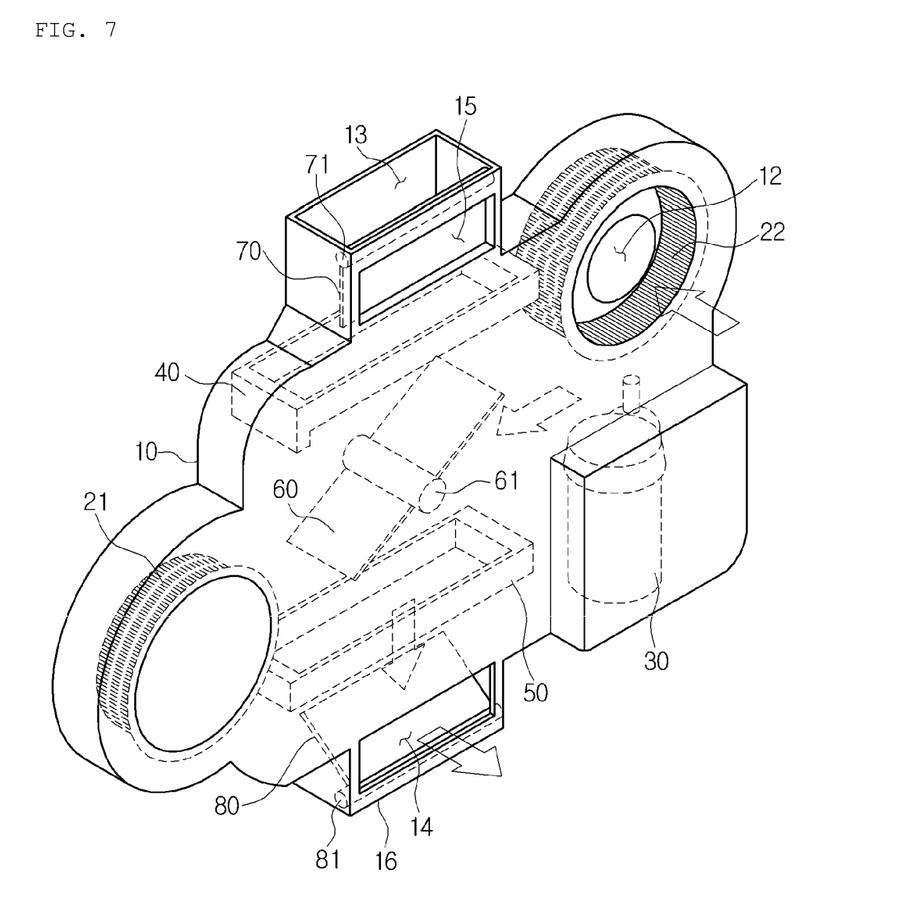

Meanwhile, FIGS. 4 and 5 are views showing a used state of the air conditioner for a vehicle in a cooling mode, and FIGS. 6 and 7 are views showing a used state of the air conditioner for a vehicle in a heating mode.

In the state that the direction changing door 60 is located as illustrated in FIGS. 4 and 5, the first indoor outlet 13 and the first outdoor outlet 15, which are upper part air outflow ports, are communicated with the outdoor air inlet 12, and the second indoor outlet 16 and the second outdoor outlet 14, which are lower part air outflow ports, are communicated with the indoor air inlet 11.

Moreover, in the state that the direction changing door 60 is located as illustrated in FIGS. 6 and 7, the first indoor outlet 13 and the first outdoor outlet 15, which are the upper part air outflow ports, are communicated with the indoor air inlet 11, and the second indoor outlet 16 and the second outdoor outlet 14, which are the lower part air outflow ports, are communicated with the outdoor air inlet 12. The condenser 40 is disposed at the upstream side of the first indoor outlet 13 and the first outdoor outlet 15 in the air flow direction, and the evaporator 50 is disposed at the upstream side of the second indoor outlet 16 and the second outdoor outlet 14 in the air flow direction. In more detail, the condenser 40 is disposed at the upstream side of the first door 70 and the evaporator 50 is disposed at the upstream side of the second door 80 in the air flow direction.

The condenser 40 and the evaporator 50 may have a heat exchanger structure including a header, a plurality of tubes and pins. In the drawings, the condenser 40 and the evaporator 50 are illustrated in brief, but the heat exchanger may have a structure that it lies horizontally. That is, the heat exchanger is arranged in such a way that the tubes and the pins vertically cross the passageway with respect to the air flow direction so that air passing the condenser 40 and the evaporator 50 can sufficiently exchange heat with the refrigerant flowing therein.

Additionally, the compressor 30 and the accumulator 31 may be arranged at a proper places of the case 10 located directly below the outdoor air inlet 12. In this instance, components which generate heat, like the compressor 30, are preferably arranged in a warm air passageway adjacent to the condenser 40 to utilize waste heat.

Moreover, the first indoor outlet 13 and the first outdoor outlet 15 are arranged at right angles to each other. That is, the first indoor outlet 13 is opened toward the upper part, and the first outdoor outlet 15 is opened toward the trunk. Furthermore, the second indoor outlet 16 and the second outdoor outlet 14 are arranged at right angles to each other. That is, the second indoor outlet 16 is opened toward the lower part, and the second outdoor outlet 14 is opened toward the trunk.

Additionally, the rotary shaft 71 of the first door 70 is located between the first indoor outlet 13 and the first outdoor outlet 15, and the first door 70 is operated from an angle of about 45 degrees between the first indoor outlet 13 and the first outdoor outlet 15 and to an angle of about 90 degrees to perfectly close the first outdoor outlet 15. As shown in FIGS. 4 and 5, if the first door 70 is at an angle of 45 degrees, the first indoor outlet 13 is closed and the first outdoor outlet 15 is opened. As shown in FIGS. 6 and 7, if the first door 70 is at an angle of 90 degrees, the first indoor outlet 13 is opened and the first outdoor outlet 15 is closed.

In the same way, the rotary shaft 81 of the second door 80 is located between the second indoor outlet 16 and the second outdoor outlet 14, and the second door 80 is operated from an angle of about 45 degrees between the second indoor outlet 16 and the second outdoor outlet 14 and to an angle of about 90 degrees to perfectly close the second outdoor outlet 14. As shown in FIGS. 4 and 5, if the second door 80 is at an angle of 90 degrees, the second indoor outlet 16 is opened and the second outdoor outlet 14 is closed. As shown in FIGS. 6 and 7, if the second door 80 is at an angle of 45 degrees, the second indoor outlet 16 is closed and the second outdoor outlet 14 is opened.

As described above, directions and positions of the first indoor outlet 13, the first outdoor outlet 15, the second indoor outlet 16 and the second outdoor outlet 14, and operational ranges of the first door 70 and the second door 80 are optimized, so that the air conditioner may have a thinner structure by reducing the thickness of the air conditioner.

In the meantime, the case 10 has an explosion-proof part formed at a portion of the case 10, and a thickness (t2) of the explosion-proof part is larger than the thickness (t1) of the case 10. Preferably, relatively thick components, such as the compressor 30, are intensively arranged in the explosion-proof part.

Referring to FIGS. 4 and 5, in a cooling mode, the indoor air introduced into the indoor air inlet 11 is cooled after passing the evaporator 50, and then, is discharged through the second indoor outlet 16. Furthermore, the outdoor air introduced into the outdoor air inlet 12 is heated after passing through the condenser 40, and then, is discharged through the first outdoor outlet 15.

Referring to FIGS. 6 and 7, in a heating mode, the indoor air introduced into the indoor air inlet 11 is heated after passing through the condenser 40, and then, is discharged through the first indoor outlet 13. Additionally, the outdoor air introduced into the outdoor air inlet 12 is cooled after passing through the evaporator 50, and then, is discharged through the second outdoor outlet 14.

Figure 8:
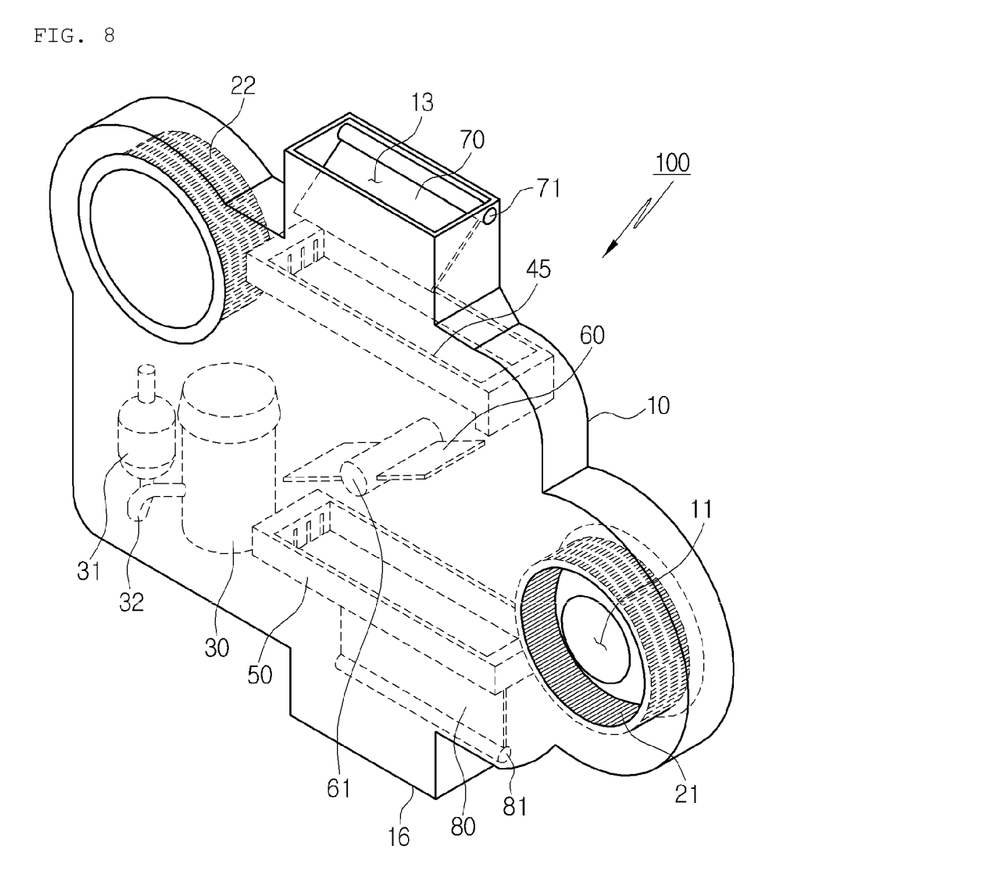
FIG. 8 is a perspective view showing an air conditioner for a vehicle according to another preferred embodiment of the present invention.

In the meantime, FIG. 8 is a perspective view showing an air conditioner for a vehicle according to another preferred embodiment of the present invention. Referring to FIG. 8, the heat exchanger includes an evaporator 50 and a heater core 45. That is, the compressor 30, the condenser (not shown), the expansion means, and the evaporator 50 are disposed in the refrigerant pipe 32 in order. In this instance, the condenser may be disposed on the outer face of the case 10. The heater core 45 makes cooling water flow inside the heater core 45 and exchanges heat with air in order to heat the air. As shown in FIG. 8, the air conditioner for a vehicle according to the present invention may be applied to a cooling system having an evaporator and using refrigerant and a heating system having a heater core and using cooling water.

While the present invention has been particularly shown and described with reference to exemplary embodiments thereof, it will be understood by those of ordinary skill in the art that various modifications and equivalents may be made without deviating from the spirit or scope of the invention. Therefore, it would be understood that the technical and protective scope of the present invention shall be defined by the technical idea as defined by the following claims.

The invention claimed is:
1. An air conditioner for a vehicle comprising:
a case having an air inflow port and an air outflow port;
a first blower for blowing indoor air, the first blower defining a first axis of rotation;
an evaporator positioned adjacent to the first blower in a width direction;
a second blower for blowing outdoor air, the second blower defining a second axis of rotation being substantially parallel to the first axis of rotation;
a condenser positioned adjacent to the second blower in the width direction; and
a direction changing door positioned between the evaporator and condenser and configured to switch a direction of ventilation of air flowing from the first blower and second blower; and
wherein the first and second blowers, the evaporator, the condenser and the direction changing door are all located on a plane that extends substantially perpendicularly to the first and second axes of rotations;

wherein the air inflow port includes a first air inflow port for introducing indoor air and a second air inflow port for introducing outdoor air;

wherein the first and second air inflow ports are located on opposite sides of the case in the width direction.

2. The air conditioner according to claim 1, wherein the first air inflow port is aligned with the first blower along the first axis, wherein the second air inflow port is aligned with the second blower along the second axis, and wherein the direction changing door is disposed inside the case to selectively direct air introduced into the first and second air inflow ports to the condenser and the evaporator depending on a position of the direction changing door.

3. The air conditioner according to claim 1, wherein one among the condenser and the evaporator is arranged to be higher than the other one in a height direction.

4. The air conditioner according to claim 1,
wherein the case further defines a first indoor outlet and a second indoor outlet for discharging air toward an interior of the vehicle, and a first outdoor outlet and a second outdoor outlet for discharging air toward an exterior of the vehicle.

5. The air conditioner according to claim 4, wherein the first and second air inflow ports are formed on opposite sides of the case relative to a thickness direction that extends parallel to the first and second axes of rotation such that air is drawn into the first air inflow port in a direction opposite air drawn into the second air inflow port.

6. The air conditioner according to claim 4, wherein inside the case, disposed are a first door for selectively discharging air to the first indoor outlet and the first outdoor outlet based on a position of the first door, and a second door for selectively discharging air to the second indoor outlet and the second outdoor outlet based on a position of the second door.

7. An air conditioner for a vehicle comprising:
a case having an air inflow port and an air outflow port;
a first blower for blowing indoor air, the first blower defining a first axis of rotation;
an evaporator positioned adjacent to the first blower in a width direction;
a second blower for blowing outdoor air, the second blower defining a second axis of rotation being substantially parallel to the first axis of rotation;
a condenser positioned adjacent to the second blower in the width direction; and
a direction changing door positioned between the evaporator and condenser and configured to switch a direction of ventilation of air flowing from the first blower and second blower;

wherein the first and second blowers, the evaporator, the condenser and the direction changing door are all located on a plane that extends substantially perpendicularly to the first and second axes of rotation;

wherein the case is mounted between an interior of the vehicle and a trunk of the vehicle in a thickness direction that extends parallel to the first and second axes of rotation, and a first side of the case in the thickness direction is arranged to face the interior of the vehicle and a second side opposite the first side is arranged to face the trunk.

8. The air conditioner according to claim 4, wherein the condenser for condensing the refrigerant discharged from the compressor is disposed at an upstream side of the first air inflow port and the first outdoor outlet in an air flow direction, and the evaporator for evaporating the refrigerant passing the expansion means is disposed at the upstream side of the second indoor outlet and the second outdoor outlet in the air flow direction.

9. The air conditioner according to claim 4, wherein in a cooling mode, the indoor air introduced into the first air inflow port is cooled after passing the evaporator and is discharged through the second indoor outlet, and the outdoor air introduced into the second air inflow port is heated after passing through the condenser and is discharged through the first outdoor outlet.

10. The air conditioner according to claim 4, wherein in a heating mode, the indoor air introduced into the first air inflow port is heated after passing through the condenser and is discharged through the first indoor outlet, and the outdoor air introduced into the second air inflow port is cooled after passing through the evaporator and is discharged through the second outdoor outlet.

11. The air conditioner according to claim 1, wherein the first blower, the second blower, the evaporator, the condenser and the direction changing door have approximately the same thickness in a thickness direction extending parallel to the first and second axes of rotation.

* * * * *